Figure 1:
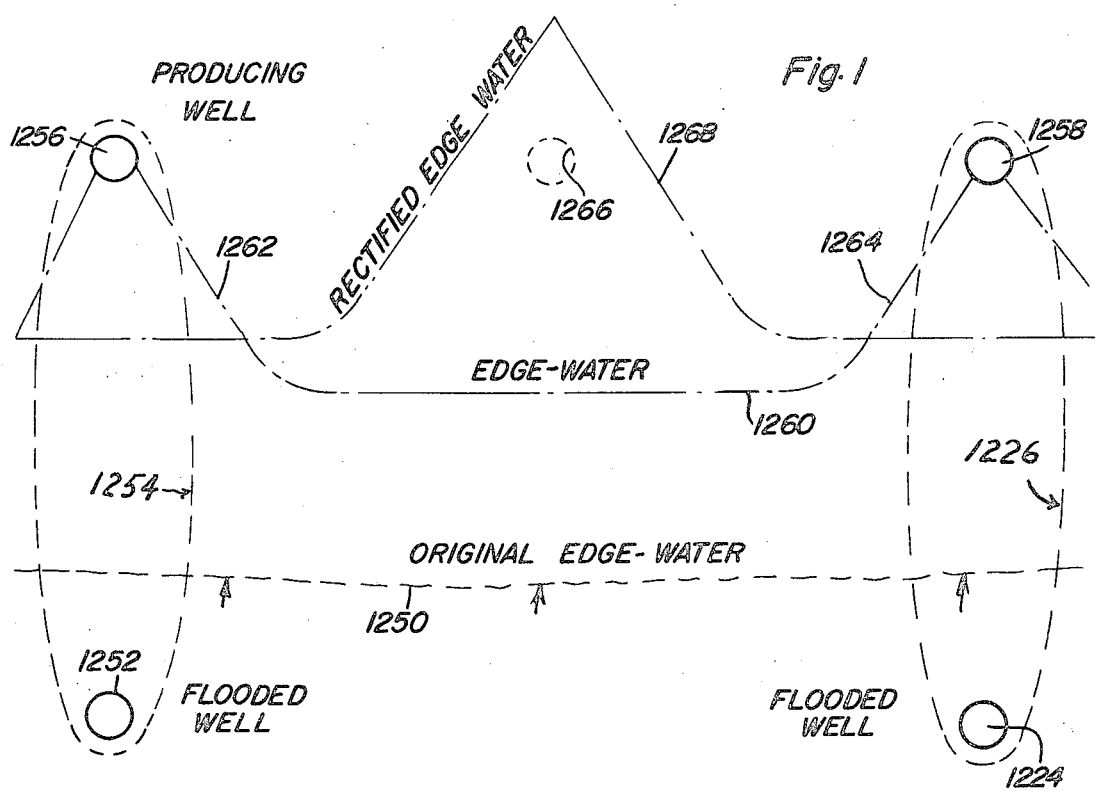

United States Patent [19]
Brandon

[11] 3,794,114
[45] Feb. 26, 1974

[54] USE OF LIQUEFIABLE GAS TO CONTROL LIQUID FLOW IN PERMEABLE FORMATIONS

[76] Inventor: Clarence W. Brandon, P.O. Box 490, Nashville, Tenn. 37202

[22] Filed: Apr. 20, 1972

[21] Appl. No.: 245,914

Related U.S. Application Data

[63] Continuation-in-part of Ser. Nos. 611,082, Jan. 23, 1967, and Ser. No. 719,882, April 9, 1968, which is a continuation-in-part of Ser. No. 665,995, June 17, 1957, Pat. No. 3,302,720, which is a continuation-in-part of Ser. No. 296,038, June 27, 1952, Pat. No. 2,866,509, and Ser. No. 241,647, Aug. 13, 1951, Pat. No. 2,796,129.

[52] U.S. Cl. ................. 166/249, 166/269, 166/274
[51] Int. Cl. .................... E21b 43/00, E21b 43/16
[58] Field of Search 166/249, 269, 273, 274, 305 R

[56] References Cited
UNITED STATES PATENTS

| | | |
|---|---|---|
| 2,623,596 | 12/1952 | Wharton et al. .................... 166/274 |
| R23,381 | 6/1951 | Bodine, Jr. ...................... 166/305 R |
| 1,658,305 | 2/1928 | Russell ............................. 166/273 |
| 2,669,306 | 2/1954 | Teter et al. ........................ 166/273 |
| 2,514,259 | 7/1950 | Roberts ............................. 166/273 |
| 2,742,089 | 4/1956 | Morse et al. ....................... 166/273 |

*Primary Examiner*—Marvin A. Champion
*Assistant Examiner*—Lawrence J. Staab

[57] ABSTRACT

Control of flow of liquids in formations is effected by introduction of a gas, or gases, into the formation and varying the pressure on the liquid in the formation, which may be an oil and gas bearing formation, and upon the introduced gas wherein inter-dispersed gas and liquid globules may be formed in selected regions of the formation, thus causing capillary blocking to flow of liquids in preselected regions of the formation.

93 Claims, 2 Drawing Figures

USE OF LIQUEFIABLE GAS TO CONTROL LIQUID FLOW IN PERMEABLE FORMATIONS

CROSS REFERENCE TO RELATED APPLICATIONS

This invention relates to novel and useful methods for control of liquids in permeable and porous formations or strata, by the introduction of gases in either gaseous or liquid form into the liquid contained in the permeable formation, and by controlling the pressure upon the liquid contained in the formation or upon the introduced gas capillary blocking of selected regions of flow of liquids in the formation may be selectively regulated and controlled as taught in this application and in my prior applications of which the subject application constitutes a continuation-in-part of my copending applications Ser. No. 611,082, filed Jan. 23, 1967, and Ser. No. 179,882, filed April 9, 1968, which are continuations-in-part of application Ser. No. 665,995, filed June 17, 1957, now U.S. Pat. No. 3,302,720, which in turn is a continuation-in-part of original applications Ser. No. 296,038, filed June 27, 1972, now U.S. Pat. No. 2,866,509, and Ser. No. 241,647, filed Aug. 13, 1951, now U.S. Pat. No. 2,796,129.

OBJECTS AND SUMMARY

An important object of this invention is to provide a method of recovering residual oil deposits in oil and gas bearing sands in which the flooding of oil and gas producing wells by the encroachment of water drives or of interstitial formation water will be retarded or halted; and wherein this retardation may be generally localized as desired by the operator.

Yet another object is to effectively control the flow of edge water or other interstitial water in oil bearing strata to retard and prevent flooding of marginal or edge wells; and to direct the flow of edge water to assist in driving petroliferous deposits in the strata between marginal or edge wells into producing wells for recovering therefrom.

More specifically, it is a very important object to provide a process whereby the flow of fluids in a permeable formation may be controlled through the creation of capillary blocks in selected regions of the formation through the use of the "Reynold's Effect" and/or the "Jamin action" and by introducing complemental fluids, where necessary, in the formation to assist in this aim. A further basic and broad important object is to provide means and methods to block various fluids in permeable formations against encroachment into other stored or being produced fluids, so as to effectively lock or substantially prevent movement of these fluids already in these permeable formations from encroaching upon fluids being stored or being produced.

A more specific object in relation to the earlier objects is to provide methods for producing a gaseous buffer zone between waterdrives and oil and gas being produced so as to more effectively drive more of the oil of oil bearing structures to producing oil and gas wells.

An additional object furthering the last object is to provide methods for adding gaseous fluids to the gaseous buffer some during continuous operation of the waterdrives.

Another and more specific object is to provide storage areas in subterranean permeable formations for various types of waste products, liquids and gaseous fluids and wherein locked off areas of the permeable formations are produced by means of introduction of gaseous fluids and liquid pressuring and releasing mediums injected into the formations by the methods hereinafter taught.

Yet a further specific object is to provide methods of preventing excessive production of gas from gas caps or sands into producing oil and gas wells, or to lock these gas structures up against movement of oil into these gas structures, wherein considerable oil would be lost into these gas caps, sands or salt dome overhangs by this oil becoming thereafter immobile oil.

Still a further specific object is to provide methods for storage places for rare gases such as helium, or to provide methods for providing storage areas for natural gases adjacent places of intermittent large usage, and wherein the stored gases are not contaminated by fluids originally in these permeable formation and so the stored gases may be retrieved and used without any substantial treatment to eliminate any contaminates.

Another important specific object is to provide methods for prevention of encroachment of saline waters as from oceans or seas around coastal areas into fresh water formations from which cities and industrial plants and operations withdraw their fresh water supply, and methods of permanently locking up these saline waters by methods of injection of gaseous fluids and pressuring and releasing liquid mediums, so that these saline waters are not a further problem to their invasion of the pressure sinks formed around fresh water producing wells as use continues by these large users of fresh waters.

A further more general object is to provide methods of use of pulsations or sonic waves of variable and controllable characteristics in conjunction with any or all of the foregoing objects so as to more effectively provide operational methods for performing these various methods of controlling flow of fluids in the interstices of capillary type permeable formations or those having varying permeabilities throughout the heighth of these permeable formations or structures.

A very important specific object in conjunction with the last above object is to waterflood oil and gas strata or formations through the injection of water and pulsations or sonic waves of controllable characteristics and where by the use of pulsations of proper character bypassed oil and gas either from former water-floods or that is being left behind in strata of extreme variability of permeability will be gathered up and be driven forward into the banked up oil and gas front that is being waterdriven to production wells and wherein the gas in the oil and gas front becomes a reflective buffer zone from which the pulsations or sonic waves are reflected back into the waterdrive and wherein the buffer zone of gas absorbs energy from the controlled sonic waves which assists in the driving of the oil and gas to producing wells.

Figure 2:
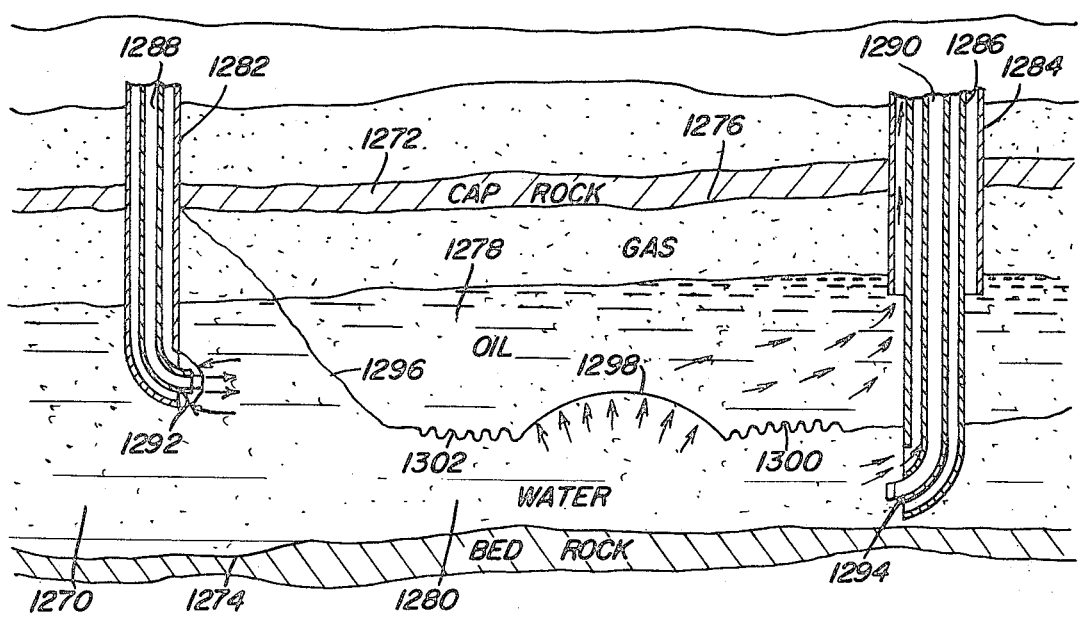

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a diagrammatic plan view of a portion of an oil field as showing the process for preventing flooding of productive wells from a water drive, or wherein undesired interstitial water such as edge water may selectively be controlled to a substantial degree by the operator by the herein taught methods of capillary blocking of the liquids of the formation by the creation of interdispersed globules of gas and liquids in preselected regions of the interstices of the formation; and FIG. 2 is a diagrammatic view in vertical section through an oil, gas and water bearing formation illustrating methods of control of production of water or oil from production wells by the utilization of the injection into the formation of liquefiable gases at the injection well and/or the same well from which desired production is accomplished, wherein control of desired production is within the operator's control by the forming of capillary blocking in the water that is coning or otherwise being produced by production wells; and wherein high frequency energy waves or sonic waves of desired characteristics may be imposed upon either the water drive from the injection well or upon edge water that has taken over the interstices of the formation adjacent the production wells, or upon the production wells whereby coning or production of undesired water at the production wells may be retarded or halted.

CONTROL OF WATER AND OIL FLOW IN PERMEABLE FORMATIONS

The teachings of this invention constitute disclosures substantially as divided out from my parent application Ser. No. 241,647 filed Aug. 13, 1951, through copending applications with established continuity to this application; together with certain added clarification therewith from an amendment of Apr. 16, 1954 which quoted applicant's explanations given to the Examiner's questions in an Office action of July 28, 1953, as to clarifying certain portions of the specification of said Ser. No. 241,647.

It is well known in the petroleum producing industry that normally less than 30 percent of the mobile petroleum deposits of a Paleozoic or gas expansive type field are recovered by the usual well drilling and producing operations; and that not more than an additional 35 percent of this petroleum are usually recoverable by presently known waterdrive methods of production, leaving at least 35 percent of the total original oil and gas deposits retained in the petroleum bearing strata and heretofore considered to be economically impossible of reclaiming.

It has now come to be generally accepted knowledge that these last-mentioned residual oil and gas deposits are rendered difficult of recovery by virtue of not only the loss of the initial gas pressure from the oil and gas deposit adjoining the production well by continued production therefrom, but also because of a condition termed "capillary lock" in the formation, otherwise known as "Jamin Action" or the "Jamin Effect." This condition comprises the presence of large numbers of capillary like passages in the oil and gas sands or permeable portions of the formation, or of interstices between the sand particles comprising the formation which are of a capillary character, wherein alternating oil globules and gas bubbles present or formed within the interstices of these capillary like formations offer such resistance to flow of fluids as to substantially prevent the normal pressures prevailing in the field and even supplemental pressures such as those imposed by fluid re-pressuring or waterdrives from effecting any substantial movement of the oil globules and gas bubbles through these capillary like passages.

In Paleozoic or gas expansive type oil and gas fields, unlike Cenozoic type fields wherein oil and gas is usually assisted in production by a natural water drive and by pressure of a gas cap higher upon the formation, the oil and gas is confined in a permeable strata or layer of oil sand between impervious strata or caprocks, with the gas coming out of solution in the oil constituting the major producing means, the oil, gas and water present in the formation after the release of pressure within the formation by a substantial amount of production of oil and gas has ensued at the production well, becomes disposed in the interstices of the formation in the form of globules of oil and water interspersed by or between bubbles of gas. Oil, gas and water are thus intermingled in a vast number of small or minute quantities, the liquids being in the form of globules, while the gas is in the form of bubbles between the globules of liquid. This globular and bubble formation within the interstices of the capillary like passages of the oil and gas strata renders the liquid far more difficult to remove or recover than if the gas and liquid were in a single phase state.

This "capillary lock" or "Jamin Effect" is so effective in preventing withdrawal of but a portion of the oil and gas initially in place in the permeable strata that often the static or bottom hole pressure of the oil and gas in the strata remains substantially at its original pressure or at a very high value for even short distances from the producing well.

The above extremely high resistance to movement offered by the interstices of these capillary like passages to the globular disposition of the liquids and gases is referred to hereinafter as "capillary lock" or the "Jamin Action or Effect," and this phenomena of resistance to flow of liquid globules and gas bubbles through the interstices of these capillary like passages in formations is so well understood that further discussion is believed to be unnecessary.

When liquids pass through capillary tubes or capillary-like formations and passages, it is evident that the small diameter of the passages opposes a resistance to flow of the liquids therethrough. It is further known that the introduction of gases into the liquid will materially vary the resistance to flow of the liquid-gas mixture through the capillary formation.

It is of significant interest that the resistance opposing flow in capillary formations is generally much higher for a water and gas mixture than for an oil and gas mixture. It is further known that turbulence in the liquid and gas mixture passing through the capillary passages further increases resistance to flow and that a critical value for such turbulence exists for a given character of liquid and gas mixture and for a given character of capillary formation. Comparative measurements of these resistences for liquids are available, known as "Reynold's Numbers," and this phenomena referred to hereinafter as the "Reynold's Effect," is utilized by this invention to obtain a more certain control of the flow of oil and water in sand or permeable formations.

In utilizing the Reynold's or Jamin Effect in this invention, I rely upon the turbulence which can be produced in the liquid-gas mixtures within the capillary formations by pressured flow and release thereof and/or by high frequency pulsations and vibrations that may be imposed thereon by the hydraulic pressure and release applying methods described in detail in my aforesaid parent applications and my U.S. Pat. No. 3,640,344 which has been incorporated into this specification by reference in order to more fully describe how pulsations and sonic waves of desired variability of characteristics may be produced for this invention.

Referring to the diagrammatic view of FIG. 1, it will be noted that there is indicated in plan view a portion of an oil and gas field having a naturally occurring interstitial water drive or wherein a waterflood has been instigated from offsetting injection wells wherein the formation has no effective natural water drive. The original front of water in the oil and gas bearing formation having a natural water drive is indicated by the dash line 1250 and it may be noted that as the edgewater has advanced through the field as oil and gas is withdrawn from the wells thereof until certain of the wells as at 1252 and 1224 have been passed by the front of the water and have been flooded and thus are producing water rather than oil and gas. As the next succeeding producing wells 1256 and 1258 are continued in operation the oil and gas deposit of the strata is further depleted and the diminishing oil and gas supply is replaced by the advancing front of the water drive so that if no preventive steps were taken the water front or edgewater would eventually assume a position corresponding to that indicated by the long and short dash line at 1260. This same situation occurs in a waterflood as shown by injection wells 1252 and 1224 wherein water being injected eventually assumes an elliptical pattern to and surrounding production wells 1256 and 1258 as indicated by the elliptical dashed lines 1254 and 1226 surrounding the injection and production wells.

It will be noted that as the edgewater or the floodwater approaches the wells 1256 and 1258 which are producing oil and gas, the relatively lower resistance to the flow of water produces coning of the water to the wells either from bottom water or variations in permeability in the oil and gas producing strata, these cones being shown at 1262 and 1264. Eventually this encroachment from the water front will choke and flood the producing wells thereby preventing further operation of the same and rendering impossible recovery of the oil and gas deposit lying between the two wells and between the cones of the water front and a mid-portion of that front shown in diagrammatic exaggeration in long and short dash lines at 1260, except by the very costly method of driving additional wells in that area as at 1266. Obviously, it it were possible to stop coning at the wells the latter could continue to draw oil until a substantial portion of the oil and gas deposit between these wells had been substantially entirely recovered.

It is an important feature of this invention to retard or stop coning in either Cenozoic or Paleozoic type fields by increasing the resistance to flow of the water in the vicinity of oil and gas wells by utilizing the Reynold's or Jamin Effect assisted by the interposition of a buffer of gas between the edgewater or floodwater and the driving pressure medium, the interposition to controllably prevent such advance and encroachment of the water front as to flood the producing wells, while allowing the edgewater or floodwater to advance between these wells, as indicated in diagrammatic exaggeration by the dot and dash line 1268, until such time as substantially all of the recoverable oil and gas continuous thereto has been recovered.

It is further proposed that liquefiable and condensable gases may be dissolved in and introduced into the pressure medium which is introduced through the well bores 1256 and 1258 and/or in well bores 1252 and 1224, these gases being retained in solution or in a liquid or condensable form by the pressure of the pressure medium and carried thereby to desired places in the formation and released from the medium by lowering the pressure.

For this purpose the fluid pressure and/or pulsation and vibration producing means of FIG. 1 of my U.S. Pat. No. 3,640,344, incorporated herein by reference as explained on page 23 of this specification, may be utilized to impose the pressure upon the pressured medium injected into the formation and to release pressures therefrom, as well as to impose pulsations or sonic waves of desired characteristics upon either the edgewater or the floodwater or upon the pressured medium being injected at either the production or the injection wells so as to set up pulsations or sonic waves of desirable characteristics in preselected regions of water approaching the producing wells so as to assist in creating the necessary and critical turbulence in the capillary formation and in the water and gas mixture therein formed by said instigation of the Reynold's or Jamin Effect which would thereafter assist in retarding or blocking the further flow or coning of water therethrough to a greater extent that the retardation of the oil and gas flow to the production wells.

To obtain the optimum effectiveness of this Reynold's or Jamin Effect inert gases such as carbon dioxide or nitrogen; petroleum gases such as the methanes, ethanes, propanes or butanes; emulsions formed of some of these gases in conjunction with some of the liquids of the strata or formation; or mixtures of any of these may be used or introduced into the formation as disclosed above. Thus there are established in predetermined areas or regions of the formation oil and gas and/or water and gas mixtures of a character susceptible to the Reynold's or Jamin Effect. By impregnating the water in predetermined areas with liquefiable or inert gases which will liquefy or dissolve into the water under proper injection pressures, that portion of the advancing waters coning to the production wells may be subjected to pressure release and/or high frequency pulsations as above mentioned thus producing the Reynold's or Jamin Effects which will retard or substantially lock up the flow of this water coning to the production wells.

By this method it is contemplated that the water front will be locked or retained substantially stationary in the interstices of the capillary like formation upon a predetermined contour relative to the producing wells from which the pulsating and exciting effects may originate or from the injection wells that are being used to waterflood and drive the oil and gas to adjacent or offsetting producing wells, so that the water front immediately adjacent the production wells may be retarded or in some instances even driven back, while permitting the water front to advance between the wells as indicated diagrammatically by the dot and dash line 1268, of FIG. 1. This advancing portion of the water front between the wells is extremely desirable in that it will tend to displace oil laterally of the same and towards the adjacent producing wells, thereby facilitating recovery of substantially most of the recoverably oil and gas. It should be noted that in the absence of some method of controlling the advance and coning of the water, the oil and gas between the wells would be incapable of recovery, since the coning of the water would choke off the flow of oil and gas to the wells, except for the possible expense of drilling further wells such as that indicated at 1266 between the producing wells. It is therefore evident that this method of controlling the advance and coning of the flooding waters by the use of interspersed globules of gas and liquid water or the forming of a buffer zone of gas between the floodwater or edgewater will enable the substantially complete recovery of the recoverable oil and gas between the wells and in less permeable portions of the strata with greater ease, less expense and with much greater efficiency, accuracy and certainty.

It is obvious that the resistance to flow through the cones of edgewater or floodwater back to the general face of the flooding water 1260 is less than that of any like cones of the same area out into the oil and gas surrounding the well bores 1256 and 1258. Otherwise there would be no inclination for the water to cone through to the well. It is generally understood that the greater resistance of the oil is due to gas coming out of solution from the oil upon production to the well and/or the field. It is also generally understood and agreed upon that the gas is in solution with the oil in a Cenozoic-type reservoir the same as it is in a Paleozoic-like reservoir. However, the gas-oil ratio is considerably lower at the water-oil contact as compared to the gas-oil ratio at the contact of the oil with the gas cap.

Now by injecting at pressures in excess of reservoir pressures, gas either liquefied or condensed at the higher injection pressure, and/or saturating a liquid with gas so that principally all of the gas is in solution at the higher injection pressures into the well bores 1256 and 1258 or injection wells 1252 and 1224, the high injection pressures will follow the path of the cone of the floodwater or the edgewater. There will of course be some spreading of the driving pressure fluid out into the oil and gas adjacent the wells, but a greater portion of the injected fluid will push back the edgewater or the floodwater cone, causing it to fan out into the upsweeping, now lower pressure and lower resistance zone 1268 between the wells (remember that the oil and gas around the producing wells are in a pressure sink and "capillary locking" has increased the resistance to flow of this oil and gas).

After an injection period (dictated by reservoir conditions such as permeability, porosity, etc.), the injection having been with or without the vibratory or pulsating means, this also dictated by certain reservoir conditions, then the well bores 1256 and 1258 or injection well bores 1252 and 1224 are lowered in pressure, as by a controlled pressure release or a controlled vibratory production. Though we are not limited to either the use of vibrations or production, it can be seen that if the injection was stopped at well bores 1256 and 1258 or 1252 and 1224, that as the reservoir began to tend toward pressure equilibrium, the gas in solution in the water and/or liquefied, would begin to gasify. Also, if vibrations were on the injected fluid as it tended toward equilibrium, then the inertia of the upsweeping edgewater or floodwater coupled with the vibratory or pulsating means, would cause a dispersion of the gas bubbles throughout the water within the capillaries or interstices of the reservoir.

To aid in further clarifying FIG. 1 as to the use of gas and/or vibratory means, I will explain in more detail the method involving the injection of a liquefiable or dissolvable gas. I will assume for this specific explanation that I am using a hydrocarbon gas, or a mixture thereof that would become gaseous with pressures in equilibrium with the reservoir pressure away from the influent of the producing wells 1256 and 1258.

Now we inject the gas into wells 1256 and 1258 or 1252 and 1224 as a liquid at a pressure and at sufficiently high enough pressure so that the pressure drop in the reservoir would not cause the liquefiable gas to begin to become gaseous for some little distance from the injection wells. As seen above, the injected fluid would follow the path of least resistance so that a greater portion would be involved in pressing back or outward and fanning out of the water cone. At the beginning of injection, or at a timed interval thereafter, vibratory means of controllable characteristics could be imposed thereon. As the pressure drop would become sufficient for the fluid to become gaseous either by controlled release of fluids at the well heads, on the low pressure part of the vibratory cycle, or at timed intervals of cycles or sequences thereof as I am capable of performing by the pressure and vibratory means hereinbefore explained, then using the inertia of the outthrust or upsweeping water as opposed to the controllable acceleration of the vibratory impulse, an interspersion of the gas globules would be caused to form in preselected portions of the formation.

Discontinuing of injection and/or start of production at the wells would cause a gradual change toward equilibrium of pressure throughout the former water coning area and the fanned out areas, particularly if vibratory impulse was continued at either the injection or the production wells, thus causing an induced capillary lock or "Jamin action" on the downstream side of the production wells between the injection wells or the edgewater and the producing wells.

We will consider now what has occurred in the oil and gas during this locking effect on the coning water. It is generally conceded that the interface of an edgewater or floodwater drive producing field may be materially undersaturated with gas, (I refer to "OIL FIELD DRAINAGE," by Herold). Yet in the pressure sink of the well the lowered pressure has released gas from even undersaturated oil, so as to form an increasing resistance to the production of oil and gas. As stated above, if the resistance to flow were not there, the edgewater or the floodwater would not cone or wedge to the well. If the fluids were pumped into the production wells against the coning of the water thereinto and then allowed a pressure release, the gas introduced thereinto as a liquid or dissolved within the pressure medium would revert to a gaseous state and thus create interspersed globules of water and gas so as to substantially lock up the capillaries taken over by the coning water and in this manner the water coning would be retarded or halted in being produced, although considerably better results could be achieved in forming this capillary locking of the water or Jamin Effect if controlled vibrations were used on either the production well or within the drive water.

If, on the other hand, vibratory impulses of controlled characteristics so as to have outward accelerations imposed on the capillary blocking gas included injected fluid, then the forward mass velocity during wave cycles of the injected fluid at the higher injection pressures would cause the Jamin Effect locked oil and gas in contact with the injected fluid to go substantially back into solution at the pressure sink of the producing wells wherein some of the injected gas would assist in further saturating the oil in the pressure sink with the higher pressured injected gas in solution in the pressure fluid where it would be an expansive factor for later oil and gas production. Here it should be seen that whereas the injected gas containing fluid would gasify in going out into the widening areas of the water cone whether the gas contained injection fluids were being injected into the drive water or into the production well, yet going out into the widening pressure sink of the oil and gas zone approaching the production wells the injected gas (being miscible with the oil) would merely go into solution with this undersaturated oil in the production sink. Thus with this method there could be simultaneous capillary locking or resistance caused to the water coning coupled with an increase in the potential energy of the oil and gas to produce at the production wells.

When production was started it would be highly advantageous to continue the vibratory impulse at either the wells in contact with the water drive or at the production wells, though no longer would it be desirable to have a very highly accelerated outthrust to the impulse. The pressure peak of this impulse as to this particular method should best approximate or go but slightly higher than the original static or bottom hole pressure of the reservoir, because the gas causing resistance to flow in the water coning area would not be given a chance to liquefy on the pressure peaks and thus break their lock, or to change the gas globules "Reynold's Effect" of changing to streamline flow of water through the coning zone from one of turbulent high resistance flow at the production pressure sink. Also, the energy of the impulse would not go into the water coning to the production wells due to the reflective ability of the bank of gas globules in the banked up buffer zone, where the impulses were being imposed on the water drive through the injection wells through which gas either in liquefied form or in solution in injected drive fluid was being or had been pumped thereinto, but instead would be expended into the banked up oil and gas being driven to the producing wells.

Verifying the use of a liquefiable gas and/or gases in solution as to their ability to perform in water the described "capillary locking" of "Jamin action" for lowered permeability, I quote verbatim from U.S. Pat. No. 2,669,307, assigned to Sinclair Oil and Gas Co., as follows:

"We have found that as the combined liquefied hydrocarbon and water drive gets under way and a liquefied hydrocarbon and water interfaces are formed within the formation, pressure drop across the formation builds up rapidly in such a way as to seriously interfere with the movement of the drive components and to require excessive input pressures. We have found that the movement of the combined liquefied hydrocarbon and water in effect causes a large drop in the permeability of the formation or a large increase in the viscosity of the drive liquids or both. We have found that the adverse change is associated with the trailing edge of the liquefied hydrocarbon charge, for use of a liquefied hydrocarbon drive alone or use of a water drive alone does not result in similar changes effecting pressure control. However, we have not been able to determine to date the cause of the difficulty although it may be associated with the so-called "Jamin action"."

I note in the aforementioned Sinclair patent that they report a loss of from 10 to 20 percent of pore space of the propane when using it backed up by a water drive upon oil in the formation. In the use of liquefiable petroleum gases it is obvious that they would not mix with the water and if a gas in solution with the water dropped out by lowering the pressure (showing the water was already saturated at the lower pressure), then how could the gas mix with the water already in a saturated state?

In FIG. 1, the well bores 1252 and 1224 could also be used as the injection wells for gases in the various uses hereinafter to be disclosed as to capillary blocking of undesired water and the locking of this in place by the use of the hereinbefore disclosed Jamin Effect, and when the gases are injected in the gaseous phase the later applied pressure of the driving liquid could either cause the gas to be come liquefied in the formation by the applied pressure of the driving liquid or become dissolved in the formation fluid or this gas could be injected in sufficient amounts to where the driving liquid would force the gas to form a buffer zone between the driven liquid and the oil and gas of the formation where some of the gas would go into the oil and gas and thus form a bank of lowered viscosity oil and gas due to the miscibility of the injected gas with oil and gas of the formation, which latter would assist in the recovery of oil and gas at the production wells due to this lowered viscosity of the banked up oil and gas front and the effective increase of permeability of the formation. It may equally be seen that this gas either an inert gas such as carbon dioxide or petroleum gases could be injected into the injection wells 1252 and 1224 in a liquid phase and this injection continued until a bank or buffer zone of this gas yet liquefied under the injection pressure could be forced up against the oil and gas and intermingled therewith, after which the injection pressure could be lowered sufficiently until this gas, which could be of various mixtures of inert gases and petroleum gases, was allowed to substantially attain its gaseous phase in the formation and thus form a buffer zone between the later applied driving liquid and the oil and gas of the formation. This injected gas either in its gaseous or liquid phase could also be injected into production wells 1256 and 1258 and caused to form the last above described process wherein a buffer zone is created between the driving liquid and the oil and gas front, for these gases are considerably more efficient in going into solution with the oil and gas and be miscible therewith, than they are in the water drive.

As to the above described process of forming and the utilization of a buffer zone, as the area around the wells into which the gas that formed the buffer zone had been injected, then in many instances this buffer zone could become less effective due to this widening area as well as the loss of the gas into the oil and gas of the formation due partially to the miscibility of this gas with this oil and gas, as well as certain losses of the gas into the water drive and in being left behind in the sweep of the water drive through the formation. Periodically or when calculations and results of production figure losses from this buffer could use the addition of gaseous fluids to this buffer zone which is maintaining a layer of cushioning material between the driven water and the oil and gas of the formation, then more gaseous material could be injected at the wells as above described in detail and this could be directed to the already established bufferzone in either its liquid or gaseous phase by the force of the water drive and thereupon allowed to attain its gaseous phase by lowering the pressure of the water drive or at the roduction wells or at both. Thus this applying of the gases to the formation in order to form a buffer zone could be on the order of a cyclic process during which cycles of gaseous fluids could be injected as to one cycle and a water drive injected as to another portion of these cycles of injection.

In the injection of these gaseous fluids and water drives considerable efficiency would be obtained in the use of pulsations and vibrations as taught in my U.S. Pat. No. 3,640,344, which was divided out of my parent application Ser. No. 655,995, filed June 17, 1957 various methods and processes are taught as to effective use of pulsations and sonic waves of variable characteristics. Any of these methods of processes as taught in this patent may be used in conjunction with the methods and processes taught in the subject instant application, for it has been found by considerable field experience that pulsations and sonic waves as taught in this above referred to patent are most effective in driving gas either loose in the formation that has been by-passed by the water drives or that has been injected into the formation around the well bore, outward until this gas forms a built up buffer zone of gaseous cushioning material up against the oil and gas of the formation where it continues to act or be a reflective wall of cushioning material from which the pulsations of sonic waves are reflected therefrom and this reflective ability of the gaseous material absorbs energy in sufficient amounts to where there is a much speeded up increase in production at the producing wells as well as a considerable increase in bottom hole pressure in the former pressure sink normally surrounding oil and gas wells that have been producing for some time. Also, it has been noted by actual field records kept over extended periods of time that water that has been coning to production wells wherein the water production was gradually taking over as being most of the fluid being produced, have been caused in some instances to be halted entirely to where only oil and gas were being produced, and this condition has extended to periods of time extending to a year or two before water has started coning to the wells again. The highs and lows of pressure caused within the formation and against the buffer zone by the rarefaction and compression cycles of these waves, which may be modulated at timed intervals or desired moments of a series of these waves, as described in detail in the aforementioned patent, may be used to considerably amplify these waves at these intervals either as to greater rarefactions or higher pressure peaks, and these rarefactions may be used as a means of assisting in the injection of these gases into the formation and outward to the aforesaid buffer zone and banked up oil and gas being driven to the production wells.

In formations or strata wherein the oil is considerably satuated with gas and is waterflooded by means of injection wells as illustrated by wells 1252 and 1224 of FIG. 1 and wherein pulsations or sonic waves of controllable characteristics as last described above are being used, it is often not necessary to inject gaseous fluids into the formation, for the controlled sonic waves will gather sufficient gas from intersices of the formation that would be normally by-passed by the waterflood and will drive this gas forward into the oil and gas front where it acts as a gaseous or emulsified cushioning buffer zone between the waterflood and the banked up oil and gas that is being driven to producing wells as at 1256 and 1258 of FIG. 1.

In FIG. 2 there is shown a further diagrammatic view in vertical section through an oil and gas bearing strata 1270 between cap rock 1272 and bed rock 1274, and by way of example the oil and gas strata includes an upper layer of gas 1276, an intermediate layer of oil and gas 1278, and also may contain a bottom layer of water 1280 which may be bottom water within the strata, or coning of water to production well 1284 as from edgewater or a waterdrive. Although FIG. 2 diagrammatically illustrates by way of example the methods of this invention as being applied to an oil and gas bearing strata, yet as may be seen hereinafter this FIG. 2 may be applicable to all of those methods of the use of this invention as hereinbefore has been given in detail as to FIG. 1.

As FIG. 2 is used by way of example to illustrate the hereinbefore given methods of use of this invention as applied to an oil and gas strata and other methods hereinafter recited, I have shown at 1282 and 1284 a pair of well casings penetrating into the strata 1270. In this illustration each of these casings being extending into the oil and gas layer 1278 and below the gas layer 1276, so that this gas does not have access to either injection well 1282 or producing well 1284, but wherein should access be desired to this gas in performing any of the methods herein recited the casing of either the injection well or the production well could be perforated any place in this interval of gas containing permeable formation so as to establish communication therewith.

Enclosed in the casing 1284 of this production well may be an inner casing 1286 extending below the oil and gas layer 1278 and into the water layer or section 1280. Tubing 1290 may extend down through casing 1286, and where directional control of this tubing is desired tubing 1290 may terminate with laterally extended and directed nozzle 1294. Enclosed in the casing 1282 of the injection well may be tubing 1288 which may be extended down casing 1282 until it is located adjacent the oil and gas layer 1278, and where directional control of this tubing is desired tubing 1288 may terminate with laterally extended and directed nozzle 1292.

The bottom of the tubing 1288 applies fluid under pressure against the oil and gas layer or strata 1278 as in the fashion of a water drive or other pressured mediums that are used to drive oil and gas of production strata to production wells, such as shown in cased well 1284. Wherein directional control is desirable as in the use of pulsations or sonic waves of such a character as to assist the pressure medium in driving the oil and gas to the production wells, then nozzles such as that shown by 1292 may be used. Where the water is sweeping past or ahead of the injection well 1282 as at the oil and gas front and the water front indicated diagrammatically by the line 1296, then a banked up oil and gas may be formed against which the driven pressure medium exerts a force. Where a waterdrive or other pressured fluid mediums are being injected down through injection well 1282, then the injection of gaseous fluids that are injected into the strata to form the interspersed gas and liquid globules to create capillary blocking Jamin Effects or in the forming of a buffer zone of cushioning material at the oil and gas front, as explained hereinbefore in much detail as illustrated by FIG. 1, may be injected at either the injection well 1282 or at an appropriate portion of the strata entered by production well 1284.

Further, these gaseous fluids which may include inert gases such as carbon dioxide or nitrogen; petroleum gases such as the methanes, ethanes, propanes or butanes; emulsions formed of some of these gases in conjunction with some of the liquids of the strata or formation; or mixtures of any of these; may be injected in either gaseous, condensed or liquefied form and may be injected prior to the application of a pressured medium thereto, may be injected thereafter at one or more intervals of time or in a cyclic manner. These last above enumerated gases, emulsions or mixtures thereof, may be injected substantially simultaneously with the driven pressure medium or water drive, so that the gaseous fluids may become substantially liquefied or condensed by either the applied pressure or by going into solution or dissolving within the driven fluids or fluids of the oil and gas strata, by injection into injection wells such as at 1282 or by injection into production wells such as at 1284.

In certain types of permeable formations that are oil and gas or gas bearing, there is such a variability of permeability in the strata as laid down by ancient seas or bodies of waters, as allow most of the waterdrive or edgewater to begin to cone to production wells drilled thereinto in a short span of time after the production well was placed on production. Despite the operators of these types of wells having engineers spend years of time and effort and vast sums of money, no one prior to my early disclosures of the use of capillary blocking Jamin Effect or of the use of buffer zones created by introducing gases has arrived at any satisfactory solution to this problem of water from waterdrives or edgewaters coning to producing wells, where in a relatively short span of time the total production from these types of wells is mostly water.

Also, many times a gas containing strata adjacent a productive oil and gas strata, such as shown diagrammatically by 1276 of FIG. 2, or as from a gas cap or gas trapped up under the overhang of a salt dome, may begin coning gas to production wells at an early stage of oil and gas production from the well.

This last above is due, at least in part, to the fact that the gas being a one phase fluid will more readily be produced at a production well, than will the at least two phase fluids that normally exist in oil and gas bearing strata which soon forms a pressure sink of gas coming out of solution with the oil and forms the so-called Jamin Effect of capillary blocking or retarding of the flow of oil and gas to producing wells, such as illustrated at 1284 of FIG. 2.

Further, where there is a gas sand and a water producing sand both having access to a producing well, as illustrated by way of example at well 1284 of FIG. 2, the operator of the well or wells may soon have both gas and water coning to the producing well or wells and thus be excluded from any substantial amount of oil being produced at the producing well or wells. By using extreme care in where access is given to a productive strata, as at 1278, as by drilling the well bore down into oil and gas strata and letting the cemented casing seal off the gas containing strata, as at 1276, or in drilling through most of the oil and gas strata, cementing the casing through substantially all of the oil and gas strata and then thereafter perforating the casing at selected portions of the oil and gas strata, then considerable producing time of the oil and gas may be had before the gas and/or the water begins coning to the well bore and starts the above gradual excluding of the production of oil and gas at the production well. By proper use of Jamin Effect or of creating a buffer zone by the introduction of gases into the strata without or with the assistance of the hereinafter described use of pulsations or sonic waves of extreme variability of desired characteristics given to these pulsations or sonic waves, the gas and/or the water coning to these production wells may be substantially halted or retarded even where the gas and/or water bearing strata may be open to the well bore.

As to a detailed explanation of my various methods of producing pulsations, vibrations or sonic waves as to desired variable characteristics as subsurface formation permit or need as to performing the various methods taught herein and diagrammatically illustrated by way of example in FIGS. 1 and 2, wherein pulsations or sonic waves are used therein, I am incorporating in the subject application essential material to support portions of this specification and the limitations of certain of the claims which deal specifically with methods of use of pulsations or sonic waves, by reference to my issued U.S. Pat. No. 3,640,344, a copy of which is attached hereto. The essential material I wish to incorporate from this patent are FIGS. 1, and 8–14; and portions of the specification beginning at line 50, Column 11 to line 55, Column 15; line 66, Column 15 to line 31, Column 18; and line 38, Column 18 to line 54, Column 19.

I have found by the considerable field use of the above incorporated essential material explaining actual field uses of various methods of producing pulsations or sonic waves, that where water has becoming rapidly coning to production wells to the almost exclusion of oil and gas production at that well, that by going onto the production well and using introduced gas or gas that is also coning to the well with apparatus similar to that illustrated by FIG. 1 of said U.S. Pat. No. 3,640,344, that within a day or two that substantially all of the water coning to the production well can be halted and substantially locked in place and that such locking up of the formation may continue at production wells for more than three years, while oil and gas production continues to improve from the moment that the coning water was locked in place and at the end of the more than three years oil and gas production had increased by more than 50 percent over what oil and gas production was when the coning water was first locked in place, yet operation of the sonic wave apparatus on the production well was only for a few days.

In a desire to make a determination as to whether the capillary lock on the coning water could be considered permanent in its effect and also to determine whether this sonic wave apparatus could truly perform my methods of forming capillary locking of the more open interstices of the formation at this production well, having on hand recognized petroleum engineers, I had the well swabed continuously to see what could be pulled back out of the coning water area and the more permeable portions of the formation through which water had also been coming to the production well prior to my treatment.

I found that truly a Jamin Effect capillary locking of the formation had been performed for in the water that could be swabed from this production well there were multitudinous interspersed bubbles of gas mixed with the water. Also I found that another extremely worthwhile effect had been produced in the more permeable portions of the oil section in this well, which was that a large amount of stable emulsion had been formed of interspersed gas, oil and water globules, which had been blocking off the former production of mostly water from these more open variations of permeability in the face of the strata exposed to the well bore. So that I found that in my successful treatments in the past wherein I had used the methods taught in the present or instant application, that I had been truly able to create Jamin Effect blocking of formations with the added benefit of being able to form substantially stable emulsions at a great distance into the strata along with the Jamin Effect, so that where if I continued to use the sonic wave apparatus at various times or continuously on injection wells, that any time that a water drive would again break back into the more permeable stratifications of productive formations, that at most a few days use of the sonic wave apparatus in practicing the methods herein taught, that the capillary blocking could again be utilized in blocking off water coning to production wells or more permeable portions of the strata.

The last recited blocking off of coning of water from a water strata or from more permeable portions of the stratified formation and the ability to form relatively stable emulsions in situ by use of the above recited use of sonic wave apparatus in performing some of the methods disclosed in this application, and the ability to perform these methods at a producing well or an injection well, was ably demonstrated in the last above example of successful forming of Jamin Effects and in the forming of emulsion slugs or buffer zones to act as a cushioning material between a water drive and oil and gas that is being driven to producing wells, by the fact that the nearest producing well to the well that was being treated was also successful in having a substantial portion of the water that was coning to also be halted of a substantial portion of the water that had been formerly coning to that producing well.

The noted difference in the halting of water coning to both of these wells, as may confirmed by notes written by competent petroleum engineers, was that the producing well upon which the sonic wave treatment was given had its water coning substantially halted as soon as the treating fluids had been pumped back out of the well bore. Whereas the offset producing well which was some 1300 feet away from the treated well, had its decline in water coning some six months after the treatment was given to the other well, showing that the capillary blocking and forming of the buffer zone was formed some distance back in the formation at some former built up interface of water drive and oil and gas front through which the water had been coning.

The last above recitations of the effects of the use of sonic waves in performing the methods taught in the instant application as to production wells and injections wells is placed herein only to show more recent successful use of these herein taught, a great many others having been performed prior to these last examples on both injection and production wells.

Wherein if two sonic wave apparatus are used at one time on both the injection well and the production well as shown in FIG. 2, wherein a water drive is being used to enhance production at well bore 1284 and where capillary blocking is being used to block off coning water to producing well 1284, whether the capillary blocking is being produced by interspersed liquid and gas globules in the capillary like interstices or whether a buffer zone of gaseous cushioning material or emulsions are being used in the formation between the water drive front and the banked up oil and gas front, as at lines 1296, 1303 and 1300, then by proper use of sonic waves or pulsations of desirable characteristics, the production of oil may be greatly enhanced, as follows:

Where gaseous fluids are introduced simultaneously at both injection well 1282 and production well 1284, then the building up of the so-called Jamin Effect of prevention of water coning and/or simultaneously therewith a cushioning buffer zone of gaseous fluids and emulsions may be formed adjacent a banked up oil and gas front that may be produced by injections of fluids at injection well 1282, with or without the use of the sonic wave apparatus although the sonic waves if used in conjunction with the introduction of the gaseous fluids have a much speeded up action in the forming of the capillary blocking, then the prevention of water coning to production well 1284 may be substantially halted or blocked from being further produced.

A substantially greater effect may be had upon the production of oil and gas from formations or strata under the influence of either a water drive or an edge water drive is that the producing wells form a pressure sink wherein capillary blocking is induced in the oil and gas being produced by the gas coming out of solution in the pressure sink adjacent the producing wells and this in turn reduces the flow of oil and gas being produced. Simultaneously with the forming of the producing pressure sinks and increasing somewhat proportionately in a reverse ratio is the by-passing of oil past and between wells forming producing pressure sinks.

Although numerous schemes and much experimentation by the best of the petroleum engineers that are in the oil industry has been tried, yet prior to my early teachings as in this application no one has been able to complete production of this oil and gas which driving water continues to push past production wells. This is diagrammatically shown in the plan view of FIG. 1 by lines 1262, 1260 and 1264.

However, there are several methods that may be practiced by my sonic wave apparatus as of FIG. 1 of my U.S. Pat. No. 3,640,344 that will allow the operator to obtain a substantial portion of this oil and gas by-passing production wells such as shown by wells 1256 and 1258 of FIG. 1. Coming back to FIG. 2 it may be seen that by using variable characteristics on sonic waves or pulsations being introduced in both injection well 1282 and production well 1284, that beneficial results may be obtained by augmenting the sonic waves from both of the wells as by having having the waves in phase as they meet in the formation, as shown at 1298, to thus increase the amplitudes of the characteristics of the waves coming down each well bore. This alone would exert a force upon the oil and gas by-passing producing well 1284 so as to assist in this oil and gas being produced at producing well 1284 and other like producing wells.

At times where a satisfactory capillary blocking of water coning to production wells such as 1284 had been accomplished by the Jamin Effect or use of a buffer zone between the driving water and the front of the oil and gas, and where it was desired to build up mainly pressure at the interface of the driving water and the oil and gas fronts, then the phase of the pulsations or sonic waves of desired characteristics being introduced at both the injection well 1282 and the producing well 1284 could be out of phase to where cancellation of the waves having like characteristics would occur and mainly pressure and heat would be formed in situ adjacent their meeting place in these interstices of the formation. Also, this application of pressure would assist in the maintaining of the capillary blocking, whether by Jamin Effect or by of a gaseous buffer zone. This region where the cancellation of impulses occurs, as indicated by 1298 of FIG. 2, will tend to strengthen and maintain the line of separation between the oil and gas front and the driving water front by maintaining the Reynold's Effect or the Jamin action and thus put a squeezing or pressure force on the oil and gas being driven to producing well 1284.

In order to insure the regions 1300 and 1302 of FIG. 2 will assist in contributing toward and in the obtaining of the most effective separation of the oil and gas layer or strata and the underlying water strata or layer 1280, where there is bottom water or a water containing strata coning to production well 1284, inert gases such as carbon dioxide or nitrogen; other gases dissolvable or miscible with the oil and gas of the strata, such as methane, ethane, propane and butane may be included in fluids discharged into this bottom water, as by means of nozzle 1292 of injection well 1282 and/or by means of nozzle 1294 of producing well 1284 in order to establish a layer or cushion of gas at the boundaries 1300 and 1302 between the oil and gas layer or strata and the bottom water strata 1280, which in turn would revert to forming the interspersed gas and liquid Jamin Effect and/or a buffer zone of the gaseous cushioning material. It is to be observed that by proper use of sonic waves of desirable characteristics that the hereinbefore described forming of in situ emulsions may be formed to be also utilized in the forming or maintenance of this Jamin Effect or buffer zone at these water and oil and gas fronts being kept in separation by these methods.

With additional reference to FIG. 2, as taken substantially as written in my amendment of April 16, 1954 as to clarifying certain portions of my Application Ser. No. 241,647 for the benefit of the Examiner, the following is herein quoted:

With reference to FIG. 2, showing an oil strata, the oil contains a percentage of low density natural gas and in situ the reservoir often contains, in a Paleozoic age structure, three or more volumes of natural gas (often computed as containing 85% of the very low density methane) to one barrel of oil at reservoir pressures. Therefore, if the nozzle 1294 is placed so that the energy waves are in contact with the oil and gas at an angle beyond the critical incident angle, substantially total reflection should occur. This is not so of nozzle 1292 which is stated to bear on the oil and gas at a normal incident angle.

From direct experimentation conducted throughout a period of months, tests show that: energy waves could be transmitted through the interstices of the structures, when the transmission fluid had formed interconnecting channels through the formation. The strata itself, when completely surrounded by the fluid transmitting the energy waves, did not appreciably transmit the energy waves. Gas within the pores did not transmit the energy waves but had an absorptive and reflective ability. The gas had to be driven from the capillaries and/or combined with the oil before transmission of energy through the structure was consumated. The energy being absorbed by the gas and the oil in the capillaries was capable of recombining the gas and oil and capable of producing oil and gas from the structure. Gas in itself, when absorbing the energy waves was capable of disintegrating and fracturing the strata. When a continuous energy wave was modulated during one cycle or sequence thereof, as to increased rarefaction and/or increased amplitude, it was found that the absorption of the energy by the gas in the interstices of this strata could be used for rapid and very intense disintegration and fracturing of the formation and that the characteristics of such an energy wave was capable of carrying the disintegrated particles from the formation along with the gas and oil. This type of modulated wave was capable of increasing oil production as well as substantially positioning the retention of gas in a desired location in the formation. The retention of gas at a location, centered the greatest intensity of the disintegration and fracturing process at this point, along with other meritorious results to an oil producing horizon.

These processes of capillary locking, disintegrating and fracturing are applicable to any liquid that is to hold back a more permeable oil producing zone in a lenticular or relatively permeable strata so as to produce oil from the tighter zones. Also, the processes are reversible in that a gas or cellular mass may have the same processes performed therein and/or thereto.

The entire uses of gas absorbable either in the water and/or oil and/or liquefiable gases absorbable to the water and/or the oil is based on the desired methods and used as stated in this specification and the prior applications referred thereto and are commensurate to the degree of control desired and/or given by the operator and will of course be dictated by the type and intensity of energy wave form and also the angular incident of the set energy wave injected at the nozzle 1294 and/or 1292, (of FIG. 2) as well as whether used in a Paleozoic or Cenozoic type of structure.

If the production or retention of advancing or drive water and/or static water in a sectional or bottom water sand was desired to be locked in place or retarded in flow, then the explanation associated with FIG. 1 is applicable as well as added reference and explanation at this time.

With respect to FIG. 2, we can saturate the water with $CO_2$ at a higher than formation pressure so that the water is saturated at the pressure and if this pressure is sufficient, and it is desirable, commingled liquid $CO_2$ with the water is then injected into the water zone by nozzle 1294 (or by nozzle 1292), either with or without vibrational effects, meanwhile holding a back pressure on the oil, until the injected fluid has pushed back the water in the reservoir and/or commingled with the interstitial water to a desired amount. Thereafter, the controlled energy waves can be increased or begun on the injection fluid (injection can be stopped, continuous or periodic as desired) with or without a pressure decrease, as desired. A continuous impulse will cause the fine bubbles (of $CO_2$) to separate out of the water, which could rise by their smallness through the water in the capillaries so that a layer of gas could accumulate up against the oil (which is already supersaturated (with gas) in the pressure sink at the well) where the coning of water (to producing well 1284) has occurred. Elsewhere expansive energy and viscosity of the oil would be benefited where a layer (or buffer zone) of $CO_2$ and gas could be formed and maintained. It is obvious that a zone of intermingling of the $CO_2$, gas, oil and water would be above and below this layer (or if the gas layer (or buffer zone) was proceeding, as from nozzle 1292 the intermingled zone would be ahead of and behind this layer (or buffer zone) of gas).

Assuming that from nozzle 1294 we have no impulses going to the well (1284) above (or ahead of) the $CO_2$ and/or gas (buffer zone), then we have the very meritorious feature of the washing action of the cyclic absorbed energy in the gas in the commingled transistory zone (from energy waves that have been or are being transmitted to the water from Nozzles 1294 and/or 1292), in the recovery of both mobile and immobile oil and the lowering of its viscosity. As to the action of the high pressure $CO_2$ and/or gas layer (or buffer zone) under (or behind) the oil, it is to be remembered that the saturated (with gas) oil above (or ahead) is in small capillaries, and that there is no immediate pressure sinks for the gas (buffer zone) to by-pass to, and the oil is being swept (toward the production well 1284) in a state of uniform pressure (though some gas would bypass) so that the action of the gas would be similar to the principle of maintaining a steel ball above a jet of air.

As to the natural gas, reference was repeatedly made to $CO_2$ at the interface of the water and oil. It has long been acknowledged by those skilled in the art that $CO_2$ is highly beneficial in the production of gas and oil from a producing strata. Though there seems to be a diversity of opinion as to all the reasons why $CO_2$ is beneficial, one known is that $CO_2$ frees a great deal of the gas that remains in the reservoir after water has replaced the oil, as in a waterflood. Quoting from "Additional Oil Production through Flooding with Carbonated Water", in World Oil of August 1951, page 180: "Use of carbonated water promotes the production of natural gas from a water flooded oil sand. In some oil sands that have been water flooded over a period of years, and in which the gas content of the oil is less than 25 cubic feet of natural gas per barrel, the amount of natural gas produced during the carbon dioxide flood increased to approximately 300 cubic feet per barrel of oil. The gas so produced was remarkably rich gas."

From the above, it can be seen that we will add natural gas to the $CO_2$ layer (or buffer zone, from the reservoir). Also, the impulse effect of increasing release of $CO_2$ from the water (when energy waves are used), will cause an added production of oil, which oil would go into the impulse receiving transitory zone on the water side of the layer (or buffer zone) of gas, and of course could be produced near the culmination of production at that well (1284), or swept on up the structure to other wells.

The use of liquefiable hydrocarbon gases could be injected in a similar manner at nozzle 1294 or 1292, but due to gravitational effect would tend to stay near the top or head of the water, though the forming and maintaining of a gas layer (or buffer zone) would be approximately the same, and it seems that the "capillary locking" would be more intense as evidensed by the aforementioned Sinclair patent and by experiments. It would seem that a proper proportioning of an inert gas such as $CO_2$ and a liquefiable hydrocarbon gas (as I have proposed) would be the best for certain reservoir conditions.

CONTROL OF WATER AND GAS FLOW IN PERMEABLE FORMATIONS

Besides the methods and processes already enumerated in the earlier portions of this specification, there are many methods and processes relating to the inventions disclosed hereinbefore that are adaptable to being able to control the flow of these waters and to be able to retard or substantially completely block off the movement of these waters into certain areas of the permeable formations or to lock up these waters in the intersticies or capillary like passages through which they have freely had movement or flow.

These waters that are to be blocked from further flow or retarded as to movement into other fluids are saline waters such as those coming from seas or other sources into fresh water that are being used sufficiently by production wells thereinto so that pressure sinks of fresh waters surrounds these wells to an extent to where saline waters contacting these same permeable formations from sources such as seas or oceans flow to these producing wells of fresh water and eventually become the main source of waters supplied to these wells. This may be illustrated by reference to FIG. 1, wherein wells 1252 and 1224 are fresh water producing wells that have been taken over by encroachment of saline water in the direction of the arrows as at line 1250, which line 1250 may be the extent of saline water encroachment onward toward the fresh water pressure sink surrounding producing wells 1256 and 1258.

In order to control, retard or block the flow of saline water into the production pressure sinks surrounding wells 1256 and 1258, which is usually due to these fresh water wells not being supplied with sufficient fresh water that often has to travel great distances to get or perculate through these permeable formations from the supply source for these fresh waters, any of the methods hereinbefore explained to methods to control, retard or block flow of waters coning to producing oil and gas producing wells or to block waters coming to producing oil and gas wells from more permeable sections of oil and gas productive strata may be used. However, by way of example I will show how at least one of these methods are applicable to the retarding or prevention of encroachment of saline waters into fresh waters, as follows:

The former production wells for fresh water that are now encroached upon by saline waters, may become the injection wells 1252 and 1224 for introduction of liquefiable gases or gases that are dissolvable in the saline waters. These gases may include inert gases such as carbon dioxide or nitrogen, may include various waste gases from industrial plants, and may include various petroleum gases such as the butanes, propanes, ethanes and methanes or their equivalents in fractionated gases, and may also include any mixtures of the above enumerated gases. These gases may be injected in a gaseous or liquefied phase, in solution with liquid pressure mediums such as water, and may be be injected in varying intervals of time of totally containing gaseous fluids or in solutions with the following liquid pressure mediums and each interval of gaseous injections may be followed by that of an interval of injection of the liquid pressure mediums.

As explained in detail in the portion of this specification dealing with unwanted production of waters at producing oil and gas wells, these gaseous fluids best are substantially liquefied or dissolved into liquids in the formation by imposing of sufficient pressure on the liquid pressure medium until these gases reach positions within or adjacent to the pressure sinks to which the saline waters are flowing to the former fresh water producing wells 1252 and 1224 or the new pressure sinks forming surrounding present fresh water producing wells 1256 and 1258. The injection path that may be followed by the introduction of gases into injection wells 1252 and 1224 are grammatically illustrated by the dashed elliptical lines 1254 and 1226 surrounding injection wells 1252 and 1224 and producing wells 1256 and 1258. After an at least initial period of injection of these gases either in liquefied phase or in solution with the liquid pressure medium at the high injection pressure and when it is estimated from past experience that certain desired areas of the intruding saline waters are covered, then the injection pressure may be lowered to that pressure that it is found will allow a substantial reversion of the gaseous fluids to their gaseous phase in the interstices of the permeable formation. Sometimes it may be necessary to bleed pressure of the liquid pressure medium off at the injection wells 1252 and 1224 in order to obtain the necessary reduction of pressure far back into the capillary like structure of the formation.

By considerable field experience in the blocking of waters off by injection of gaseous fluids into injection wells, production wells or at both the injection and production wells, I have found that the formation of interspersed gas and liquid globules within the interstices of the formation at desired locations in order to create Jamin Effect capillary blocking or in the forming of a gaseous buffer zone at desired locations in permeable formations is greatly enhanced by the controlled use of sonic waves or pulsations of controllable characteristics and the interstices of formations may be effectively blocked for years at a time against the movement of any fluids through these locked up capillaries. Yet when it is felt necessary to again inject these gaseous fluids into the former injection points, only a few minutes of properly controlled sonic waves or pulsations will allow gaseous fluids to again be injected in these locations and pressured again so as to again be liquefied or go into solution with liquids within the formation so that further areas within the formation that it is desired to be reached for controlling, retarding or blocking the flow therethrough may be reached readily by the highly pressured and substantially liquefied gaseous mediums and these new areas along with the formerly blocked or retarded areas may be again retarded, or blocked by the above described reduction of pressure upon the pressuring liquid medium. The methods of use of pulsations or sonic waves of controllable characteristics as taught in these other methods of retarding or blocking flow of waters and gases as found in this section of this specification may be found as essential material incorporated by reference to my U. S. Pat. No. 3,640,344, and the Figures and portions of the specification that are incorporated by reference into the subject application and to these other methods of use of the inventions herein taught, may be found hereinbefore on page 23 of the instant application.

These same methods as are disclosed above as to blocking off unwanted saline waters from entering fresh water containing permeable formations, may be applied to aqueous subterranean formations which are being utilized for storage of various fluids which may be gaseous or not, which fluids may consist of nuclear or industrial wastes, petroleum products or crudes, rare gases such as helium, petroleum gases such as the methanes, ethanes, propanes and butanes or their equivalents in cracked or fractionated gases, ammonia or natural gas. The use of FIG. 1 may also be used to illustrate these storage methods, wherein as in the methods as to holding saline water off from entering fresh waters the wells 1252 and 1224 may be in the water of the aqueous formation surrounding the storage area or downslope of a permeability pinchout on a structure, and the wells 1256 and 1258 may be wells giving access to the stored fluids. By using the methods above described as to blocking or retarding the encroachment of saline waters into fresh waters by the introduction of gaseous fluids and a pressuring liquid medium the waters of the aqueous formation may be blocked or retarded from flow into the storage area. It may be desirous either before, during the time of storage or at times of withdrawal of the stored fluids to withdraw at least portions of the waters within the storage area, so as to not have the stored contaminated with waters from the aqueous formation. The use of pulsations or sonic waves of controllable characteristics as hereinbefore described are especially effecacious in forming a permanent Jamin Effect capillary locking of these waters surrounding the storage area.

Many times exhausted oil and gas fields or gas caps or top gas sands are desired to be blocked or retarded from shifting the oil-gas contact positions throughout the reservoir or to have this gas blocked or retarded from being produced or coning to or from producing oil and gas wells, especially where the oil and gas portion of the structure is being repressured by injection of fluids. It has been estimated by recognized authorities many millions of barrels of oil are unrecoverably lost in many individual oil and gas fields that have a top gas sand or gas cap into which oil is pushed by repressuring operations, or by withdrawal of gas from the gas caps or top sands, because this oil goes into interstices of the gas formation that have never been oil-wet and adheres thereto thereafter as immobile oil. Also, many times these gas caps or gas sands are used as storage areas for various fluids, and the intermittent pumping into and withdrawal of these fluids from these gas areas causes a fluctuation of oil-gas contact positions within the reservoir that causes the permanent loss of oil as hereinabove described. By using the methods above described as to fluid storage areas and the use of introduced gaseous fluids or the use of those gaseous fluids at or adjacent the oil-gas contact and the use of a liquid pressuring and releasing medium through injection wells, the oil-gas contact positions may be locked in permanent or retarded position, be prevented or retarded from being produced at oil and gas production wells and by the use of the hereinbefore described controllable pulsations or sonic waves a more permanent, faster and complete Jamin Effect capillary locking of the oil-gas contact position may be done. For the use of these methods again FIG. 1 may be used to grammatically illustrate these methods, wherein wells 1252 and 1224 may be injection wells adjacent the oil-gas contact as shown by line 1250, for the introduction of gaseous fluids and the pressuring and releasing of a liquid medium, and wells 1256 and 1258 may be wells into the gas cap or top gas sand, which wells may also be used for production from the gas cup or gas sand or for introduction of stored fluids into and out of these gas bearing structures.

Another use by the oil industry for storage of gaseous fluids in gas bearing structures is that of the storage of helium and other rare and expensive gases thereinto. In the pumping of these rare and expensive gases into gaseous structures, a considerable mixing of the rare gases with the gases already in the structures often results. When these rare gases are retrieved from the structures for use, time consuming and costly methods of fractionation or of rectification are used in order to separate these rare gases from the other gases. By proper use of the methods described above as to locking gases in position surrounding gaseous fluid storage areas, by the injection of gaseous fluids and/or liquid pressuring mediums into wells adjacent the outlines of the storage areas for these rare gases, then other gases may be prevented or retarded from co-mingling with these rare gases being stored and upon withdrawal of these rare gases for use, a substantially much less or no re-rectification of these gases should be required. In this rare gas storage method the FIG. 1 may again be used, wherein wells 1252 and 1224 may be wells used for injection of gaseous fluids and/or pressuring and releasing by means of a liquid medium for the Jamin Effect capillary locking of gases already in the structure, so as to prevent or retard these gases from entering the rare gas storage areas surrounding rare gas injection and withdrawal wells 1256 and 1258. It will be much better to lock up the gas already in the structure by the performing of the methods hereinbefore described through wells 1252 and 1224 at the outlining limits of the rare gas storage, and then retrieve as much as possible of the gas already in this designated storage areas for the rare gases before any of the rare gases are pumped thereinto, in order to have the smallest amount of contamination of these gases with the rare gases. Again much greater efficiency and less time is consumed in locking up the perimeter of the rare gas storage area by the use of pulsations or sonic waves of controllable characteristics on these perimeter wells 1252 and 1224 as hereinbefore described in great detail in methods of locking up capillary type formations by this Jamin Effect or by the use of a gaseous buffer zone in the formation.

Also, in the drilling of well bores and the driving or drilling of mine shafts and operations into and through permeable formations, often there are encountered permeable fluid containing formations that allow varying types of waters or other fluids such as gases to enter the well bores or mine workings and thus greatly hinder further operations. In the case of well bores these fluid containing formations often cause well blowouts by the gas lightening up the weight of the well drilling fluids, or are the cause of loss of weighted drilling fluids into the permeable formations, which often require the introduction into these permeable formations of vast quantities of formation plugging materials. The prevention of these fluids from hindering the drilling of well bores or of mining operations may be done by proper use of the locking up of fluids in permeable formations by the use of the methods of Jamin Effect capillary locking hereinbefore described in considerable detail and in particular the use of proper pulsations or sonic waves of controllable characteristics as also hereinbefore considerably discussed capillary locking by the Jamin Effect should be used in the locking up of these fluids encountered by well drilling or mining operations. In the injection of gaseous fluids and/or pressuring and releasing of liquid mediums used to practice these methods, should best be from within the well bores or mine shafts or workings. This may best be diagrammatically illustrated by reference to FIG. 2, wherein well bore 1284 may be the well bore being drilled or the mine shaft being sunk into varying types of formations. Fluid containing layers of fluid containing formations may be designated as being either fluid layer or strata 1278 or 1280 may be locked in place by injections of gaseous fluids and/or liquid pressuring and releasing mediums down through the annulus between casings 1284 and 1286, the annulus between casing 1286 and tubing 1290 or down tubing 1290. In some instances where the wells bores or mine workings 1284 may not be able to effectively lock up these fluids interfering with the well boring or mining operations by injecting the capillary locking fluids from within well bore or mine shaft 1284, then well bores such as that shown by 1282 may be located at adjacent locations so as to intersect the fluid containing formations and lock up these fluids by the methods hereinbefore described and thus by Jamin Effect capillary locking up these permeable fluid containing formations so that the fluids contained therein may not to a substantial degree continue to interfere with the well drilling or mining operations.

What I claim:

1. A method of controlling the flow of liquids in formations of a capillary character which comprises
   introducing a gas into the formation liquid,
   controlling and varying the pressure upon the liquid and the gas contained therein to thereby determine the phase in which the gas exists,
   and thereby cause the formation of interspersed gas and liquid globules in the capillary formation.

2. The method of claim 1 wherein the gas is introduced into the liquids in the liquid phase of the gas.

3. The method of claim 1 wherein the introduced gas is soluble in the liquid.

4. The method of claim 1 including the step of applying pulsations to the liquid of such character as to cause the gas to change from its liquid to its gaseous phase during such pulsations.

5. The method of claim 4 wherein the pulsations applied to the gas and liquid are applied in a controllable and variably spaced sequence of impulses.

6. The method of claim 1 wherein said liquids are the water and oil of an oil and gas bearing strata and said gas is introduced at either an injection or production well.

7. The method of claim 6 wherein said introduced gas is an inert gas such as carbon dioxide or a petroleum gas or mixtures thereof.

8. The method of claim 7 including controllably varying the pressure upon the water in the oil and gas strata in a sufficient amount to where said interspersed gas and liquid globules are formed in said water which is coning to production wells, creating in said water capillary blocking Jamin Effects that retards or blocks flow of said water to said production wells.

9. The method of claim 8 including the step of applying pulsations or sonic waves of such a character to said liquids as to assist in causing said gas to change from its liquid to its gaseous phase during such pulsations or sonic waves.

10. The method of claim 9 wherein the pulsations or sonic waves are applied in a controllable or variably spaced sequence of impulses.

11. The method of claim 1 wherein said liquids in said formation are waters which are desired to being blocked, retarded or prevented from encroaching into other fluids within said formation of a capillary character, controllably varying the pressure upon said waters and said gas to where said interspersed gas and liquid globules are formed in said waters, creating in said waters capillary blocking Jamin Effects that retards or blocks flow of said waters into said other fluids.

12. The method of claim 11 including the step of applying pulsations or sonic waves of such a character to said waters and said gas as to assist in causing said gas to change from its liquid to its gaseous phase during said pulsations or sonic waves.

13. The method of claim 11 wherein said waters are saline waters such as from oceans or seas and said other fluids are fresh waters in said capillary formation.

14. The method of claim 12 wherein said waters are saline waters such as from oceans or seas and said other fluids are fresh waters in said capillary formation.

15. The method of claim 11 wherein said waters are waters in an aqueous permeable formation which is being used to store said other fluids which may include petroleum gases, inert gases or ammonia, whether in their gaseous or liquid phases, or petroleum and various petroleum products.

16. The method of claim 12 wherein said waters are waters in an aqueous permeable formation which is being used to store said other fluids which may include petroleum gases, inert gases or ammonia, whether in their gaseous or liquid phases, or petroleum and various petroleum products.

17. The method of claim 1 wherein said liquids in said formation are waters which are desired to being blocked, retarded or prevented from encroachment into mining operations in various strata adjacent or having fluid flow communication with said mining operation, controllably varying the pressure upon said waters and said gas to where said interspersed gas and liquid globules are formed in said waters, creating in said waters capillary blocking Jamin Effects that retards or blocks flow of said waters into said mining operation.

18. The method of claim 17 including the step of applying pulsations or sonic waves of such a character to said waters and said gas as to assist in causing said gas to change from its liquid to its gaseous phase during pulsations or sonic waves.

19. The method of claim 1 wherein said liquids in said formation are waters which are desired to being blocked, retarded or prevented from encroachment into bores being drilled through said capillary formation or wherein drilling fluids used in said drilling is blocked, retarded or prevented from encroachment into said waters in said capillary formation, controllably varying the pressure upon said waters and said gas to where said interspersed gas and liquid globules are formed in said capillary formation, creating in said capillary formation capillary blocking Jamin Effects that retards or blocks said formation from flow of fluids out of or into said formation.

20. The method of claim 19 including the step of applying pulsations or sonic waves of such a character to said fluids in said capillary formation and said gas as to assist in causing said gas to change from its liquid to its gaseous phase during said pulsations or sonic waves.

21. The method of claim 1 wherein said liquids are a petroleum deposit, including the step of applying a pressure drive to the petroleum deposits at a location spaced from that at which said liquefiable gas is introduced.

22. The method of claim 21 including the further step of subjecting said pressure drive to pressure varying pulsations or sonic waves.

23. A method of directing and controlling the flow of oil and gas in an oil and gas bearing strata which comprises applying a water drive to the strata, applying and maintaining a layer of cushioning material between the adjacent fronts of the water drive and the oil and gas deposit in the strata to establish a buffer zone therebetween, including the step of introducing gaseous fluids into said water drive, directing said gaseous fluids to said buffer zone, the step of selectively reducing the pressure of the water drive to permit dissolved gaseous fluids to attain their vapor phase.

24. The method of claim 23 wherein inert gases such as carbon dioxide, petroleum gases or mixtures thereof are included in said gaseous fluids being directed to said buffer zone.

25. The method of claim 24 including the step of at least once sequentially or cyclically repeating said introduction of said gaseous fluids into said water drive.

26. The method of claim 25 wherein said introduced gaseous fluids are miscible with or soluble in said oil and gas deposit.

27. The method of claim 25 wherein the step of selectively reducing the pressure of said water drive and thus permitting said gaseous fluids to attain their vapor phase allows the forming of interspersed gas and liquid globules in the leading edge of said buffer zone in the front of the oil and gas deposit or in the trailing edge of said buffer zone in the front of said water drive, creating in said fronts capillary locking Jamin Effects that retards or prevents breakthrough of said water drive through said layer of cushioning material forming said buffer zone.

28. A method of directing and controlling the flow of oil and gas in an oil and gas bearing strata which comprises applying a water drive to the strata, applying and maintaining a layer of cushioning material between the adjacent fronts of the water drive and the oil and gas deposit in the strata to establish a buffer zone therebetween wherein inert gases such as carbon dioxide, petroleum gases or mixtures thereof are included within the cushioning material when establishing said buffer zone, including the step of applying pulsations or sonic waves of such a character to said water drive so that interspersed gas and liquid globules are formed in said buffer zone, creating in said fronts capillary locking Jamin Effects that retards or prevents breakthrough of said water drive through said layer of cushioning material forming said buffer zone.

29. The method of claim 24 including the step of applying pulsations or sonic waves of such a character to said water drive so that interspersed gas and liquid globules are formed adjacent said buffer zone, creating in the adjacent oil and gas front or the water drive front capillary locking Jamin Effects that retards or prevents breakthrough of said water drive through said layer of cushioning material forming said buffer zone.

30. The method of claim 27 including the further step of applying pulsations or sonic waves of such a character to said water drive so as to assist in the forming of said interspersed gas and liquid globules in said fronts at said buffer zone.

31. A method of controlling the flow of liquid in a permeable formation which comprises introducing a gas in either its liquid or gaseous phase into the formation and into contact with the liquid of the formation, thereafter applying a liquid medium under pressure against the introduced gas to thereby drive the gas into the formation, controllably varying the pressure applied by the driving liquid to the introduced gas for determining the phase in which the latter exists in the formation.

32. The method of claim 31 wherein the introduced gas is inclusive of inert gases such as carbon dioxide or nitrogen, petroleum gases such as butane, propane or methane, or mixtures thereof.

33. The method of claim 32 wherein emulsions are formed of one or more of said gases in conjunction with some of the liquid of the formation, using said applied liquid medium under pressure to thereby drive said emulsion into the formation liquid, controllably varying the pressure applied by the driving liquid to said emulsion to determine the density of said emulsion driven into said formation liquid.

34. The method of claim 33 wherein said emulsion is formed in said formation liquid by intervally or cyclically controllably varying the pressure applied by the driving liquid.

35. The method of claim 32 wherein said controllable varying of the pressure applied to said driving liquid forms interspersed gas and liquid globules in said formation liquid, creating in said formation liquid capillary locking Jamin Effects that retards or blocks any movement of said formation liquid through said permeable formation.

36. The method of claim 33 including applying said driving liquid to said introduced gas in its liquefied or condensed phase until the latter reaches a desired location in said formation liquid, thereupon selectively reducing said applied pressure to allow said gas to attain its gaseous phase, creating in said formation a buffer zone of gas.

37. The method of claim 33 including the step of applying pulsations or sonic waves of such a character to said gases and said liquid of the formation so as to assist in the forming of said emulsion.

38. The method of claim 34 including the step of applying pulsations or sonic waves of such a character to said driving liquid so as to assist in the forming of said emulsion in said formation liquid.

39. The method of claim 35 including the step of applying pulsations or sonic waves of such a character to said driving liquid as to assist in the forming of said interspersed gas and liquid globules and said capillary locking.

40. The method of claim 36 including the step of applying pulsations or sonic waves of such a character to said driving liquid as to assist in the driving of said introduced gas to said desired location in said formation liquid and the subsequent reducing of said pressure to allow said gas or gases to attain their gaseous phase so as to create said buffer zone.

41. The method of claim 31 wherein said introduced gas is from another portion of the formation apart from that containing said liquid, such as from a gas cap, gas sand, gas portion of a salt dome overhang or oil and gas strata having variable permeability, from which gas is coning into a production well wherein the varying of production pressures allows oil to go into new areas of said formation and become at least partially lost irrecoverably, applying a liquid medium under pressure against said gas to drive said gas into said formation liquid, said varying of the pressure applied by the driving liquid forming interspersed gas and liquid globules, creating in said formation adjacent the gas-oil contact capillary locking Jamin Effects that retards or blocks coning of said gas to said production well.

42. The method of claim 31 wherein said introduced gas is from another portion of the formation apart from that containing said liquid, such as from a gas cap, gas sand, gas portion of a salt dome overhang or oil and gas strata having variable permeability, from which gas is coning into a production well wherein the varying of production pressures allows oil to go into new areas of said formation and become at least partially lost irrecoverably, applying a liquid medium under pressure against said gas to drive said gas into said formation liquid, continuing to drive said gas into said formation liquid until a buffer zone of gas is created in said formation liquid that retards or blocks further coning of said gas to said production well.

43. The method of claim 41 including the step of applying pulsations or sonic waves of such a character to said driving liquid as to assist in the forming of said interspersed gas and liquid globules.

44. The method of claim 42 including the step of applying pulsations or sonic waves of such a character to said driving liquid as to assist in driving said gas into said formation liquid and the forming of said buffer zone therein.

45. The method of claim 33 wherein said formation liquid is the oil of an oil and gas containing formation, continuing the application of pressure through an injection well upon said driving liquid and upon said formed emulsion to form a cushioning or buffer zone, thereafter continuing the application of said pressure to said driving liquid to drive oil and gas to production wells.

46. The method of claim 45 including the step of applying pulsations or sonic waves of such a character to said driving liquid as to assist in the forming of said buffer zone and the driving of said oil and gas to said production wells.

47. The method of claim 35 wherein said formation liquid is the oil of an oil and gas containing formation, continuing the application of pressure through an injection well upon said driving liquid and upon said interspersed gas and liquid globules as to assist in driving oil and gas from the less permeable portions of said formation to production wells.

48. The method of claim 36 wherein said formation liquid is the oil of an oil and gas containing formation, continuing the application of pressure through an injection well upon said driving liquid and upon said buffer zone, thereafter continuing the application of said pressure to said driving liquid to drive oil and gas to production wells.

49. The method of claim 35 wherein said formation liquid is the water of a water, oil and oil containing formation, and said driving liquid is water, creating in said formation water interspersed gas and liquid globules, forming capillary locking Jamin Effects that retards or prevents coning of said formation water to said production wells.

50. The method of claim 49 including the step of applying pulsations or sonic waves of such a character to said driving water as to assist in the forming of said interspersed gas and liquid globules and said capillary locking.

51. The method of claim 35 wherein said formation liquid is the oil of an oil and gas formation and said driving liquid is a water drive being injected at an injection well, but which is beginning to cone to production wells for the oil and gas, introducing said gas in said water drive, forming said interspersed gas and liquid globules in said water drive, creating in said water drive capillary locking Jamin Effects that retards or blocks coning of said water drive to said production wells.

52. A method of controllably retarding the flow of a gas in a permeable formation and which formation has a liquid medium and a gaseous medium therein which comprises causing the liquid medium to move into contact with the gaseous medium, causing agitation of the contacting surfaces of said gaseous and liquid mediums to thereby produce interspersed globules of liquid and bubbles of gas and thereby establish a capillary block against the movement of said gas in said formation, including the step of applying pulsations or sonic waves of such a character to said gaseous and liquid medium as to assist in the forming of said interspersed globules of liquid and bubbles of gas and in establishment of said Jamin Effect capillary block.

53. A method of controllably retarding the flow of a gas in a permeable formation and which formation has a liquid medium and a gaseous medium therein which comprises causing the liquid medium to move into contact with the gaseous medium, causing agitation of the contacting surfaces of said gaseous and liquid mediums to thereby produce interspersed globules of liquid and bubbles of gas and thereby establish a capillary block against the movement of said gas in said formation, wherein said liquid medium is the water of an aqueous subsurface formation which is being used to store gas containing fluids such as inert gases, petroleum gases or ammonia, whether in their gaseous or liquid phases, or petroleum and various petroleum products.

54. The method of claim 53 including the step of applying pulsations or sonic waves of such a character to said formation water and to said gas containing fluids which is the gaseous medium, as to assist in the forming of said interspersed globules of liquid and bubbles of gas and in establishment of said Jamin Effect capillary block.

55. A method of controllably retarding the flow of a gas in permeable formation and which formation has a liquid medium and a gaseous medium therein which comprises causing the liquid medium to move into contact with the gaseous medium, causing agitation of the contacting surfaces of said gaseous and liquid mediums to thereby produce interspersed globules of liquid and bubbles of gas and thereby establish a capillary block against the movement of said gas in said formation, wherein said gaseous medium is a gas or oil and gas containing permeable formation through which a well bore is being drilled and said liquid medium is the drilling mud or other liquid being used to drill said well bore, including the step of applying pulsations or sonic waves of such a character to said liquid medium as to assist in the forming of said interspersed liquid globules and gas bubbles and in establishment of said Jamin Effect capillary block.

56. A method of controllably retarding the flow of a gas in a permeable formation and which formation has a liquid medium and a gaseous medium therein which comprises causing the liquid medium to move into contact with the gaseous medium, causing agitation of the contacting surfaces of said gaseous and liquid mediums to thereby produce interspersed globules of liquid and bubbles of gas and thereby establish a capillary block against the movement of said gas in said formation, wherein said gaseous medium is a gas containing portion or a gas cap of a petroleum containing permeable formation, wherein said gas is coning or otherwise being produced to excess at production wells from said petroleum containing formation and said liquid medium is oil from the oil and gas portion of said petroleum containing permeable formation, said agitation of said contacting surfaces of said gas and oil and the producing of said interspered globules of liquid and bubbles of gas creating at said contacting surfaces a capillary block Jamin Effect that retards or prevents movement of said gas or said oil contacting surfaces within said petroleum containing permeable formation.

57. A method of controllably retarding the flow of a gas in a permeable formation and which formation has a liquid medium and a gaseous medium therein which comprises causing the liquid medium to move into contact with the gaseous medium, causing agitation of the contacting surfaces of said gaseous and liquid mediums to thereby produce interspersed globules of liquid and bubbles of gas and thereby establish a capillary block against the movement of said gas in said formation, wherein said gaseous medium is a gas containing permeable formation that has in contact with said gas a water containing portion of said formation and wherein said water containing portion of the formation is said liquid medium, but wherein said water is coning to a gas production well in said gas formation, said agitation of said contacint surfaces of said gas and said water coning to said production well creating in said water interspersed globules of liquid and bubbles of gas that prevents or retards coning of said water to said gas production well by the Jamin Effect capillary blocking formed in said coning water.

58. The method of claim 56 including the step of applying pulsations or sonic waves of such a character to said contacting surfaces of said gas and oil as to assist in the forming of said interspersed globules of liquid and bubbles of gas and in the establishment of said Jamin Effect capillary block.

59. The method of claim 57 including the step of applying pulsations or sonic waves of such a character to said contacting surfaces of said gas and said water which is coning to said gas production well as to assist in the forming of said interspersed globules of liquid and bubbles of gas and in the establishment of said Jamin Effect capillary block.

60. A method of controllably retarding the flow of a gas in a permeable formation and which formation has a liquid medium and a gaseous medium therein which comprises causing the liquid medium to move into contact with the gaseous medium, causing agitation of the contacting surfaces of said gaseous and liquid mediums to thereby produce interspersed globules of liquid and bubbles of gas and thereby establish a capillary block against the movement of said gas in said formation, wherein said gaseous medium is a gaseous fluid being kept in storage in contact with an oil and gas containing formation and wherein said liquid medium is the oil in said oil and gas containing formation which is being used as a boundary to contain said gaseous fluid, said agitation of said contacting surfaces of said gas in storage and said oil boundary creating in said gas and said oil interspersed globules of liquid and bubbles of gas that prevents or retards leakage of said stored gaseous fluid past said oil boundary by the Jamin Effect capillary blocking at said oil boundary in said oil and gas containing formation.

61. The method of claim 60 including the step of applying pulsations or sonic waves of such a character to said contacting surfaces of said stored gaseous fluid and said oil boundary as to assist in the forming of said interspersed globules of liquid and bubbles of gas and in the establishment of said Jamin Effect capillary block.

62. A method of controlling the movement of a gaseous fluid in a formation and for preventing escape of the gaseous fluid from a formation which comprises placing a liquefiable fluid under pressure in the formation in contact with that surface of the gaseous fluid which is in contact with the formation, causing the formation of interspersed gas and liquid globules between the surface of the gas and the face of the formation to thereby provide a capillary block preventing escape of the gas from the formation through said adjacent surface of the gas and said face of the formation, including the step of applying pulsations or sonic waves or such a character to said liquefiable fluid placed in the formation under pressure so as to be the cause of the Jamin Effect capillary blocking interspersed gas and liquid globules between said adjacent surface of the gas and the face of the formation.

63. The method of claim 62 wherein said gaseous fluid is a gas being kept in storage in a permeable formation, said gas being helium or other rare gases which it may be desirous of preventing being contaminated by contact with other gases which may be in said permeable formation or preventing the escape of said rare gases away from a designated area of said permeable formation.

64. The method of claim 62 wherein said gaseous fluid is inclusive of inert gases such as carbon dioxide or nitrogen; oxygen; petroleum gases such as methane, ethane, propane, butane or various gases produced by fractionation, and said formation is a permeable formation in which any of said gases are being kept in storage.

65. The method of claim 62 wherein said gaseous fluid is a gas bearing strata in a formation which has been intercepted by a well bore or mining operations in said formation and wherein it is desirous that the face of said formation be blocked or sealed by said Jamin Effect capillary blocking of said gas bearing strata.

66. A method of controlling the flow of liquids in formations of a capillary character which comprises imposing a predetermined frequency and characteristics of sonic waves or vibration upon said liquid in said capillary type formation and producing thereby in said liquid turbulence of such a character as to retard flow of the liquid through said formation.

67. The method of claim 66 including introducing gaseous fluids into said liquid causing the formation of interspersed gas and liquid globules at selected regions of aid capillary formation.

68. The method of claim 66 wherein said flow of liquids are water drives that have been forcing oil and gas in said formation to producing wells but whereas said water drives are now coning to said producing wells and taking over the production of oil and gas therefrom, said liquid turbulence of such a character being produced by said sonic waves or vibration retarding the coning of said drive water to said producing wells.

69. The method of claim 67 wherein said liquid into which said gaseous fluids are introduced being a water drive that has been forcing oil and gas in said formation to producing wells but whereas said waterdrive has been coning to said producing well and taking over production of oil and gas therefrom, said causing the formation of interspersed gas and liquid globules at selected regions of said drive water coning to said producing well forming in said water Jamin Effect capillary blocking that prevents or retards any further coning of said water-drive to said producing well.

70. The method of claim 68 wherein said sonic waves or vibration are imposed on said drive water coning to said producing wells by means of said producing wells.

71. The method of claim 69 wherein said gaseous fluids introduced into said water drive are introduced at an injection well offsetting said producing well.

72. The method of claim 69 wherein said introduced gaseous fluids are injected into said waterdrive coning to said producing well through said producing well.

73. The method of claim 66 including the step of additively imposing a plurality of high frequency vibrations or sonic waves upon said sonic waves imposed on said liquid, controlling the characteristics of each of said high frequency vibrations or sonic waves to establish wave amplification at predetermined places in said capillary formation.

74. The method of claim 73 including introducing gaseous fluids into said liquid, causing the formation of interspersed gas and liquid globules at selected regions of said capillary formation.

75. The method of claim 73 wherein said liquid is a water drive that has been forcing oil and gas in said formation to producing wells but wherein said waterdrive in coning to said producing wells, said controlled amplification of said vibrations or sonic waves retarding the coning of said waterdrive to said producing wells.

76. The method of claim 75 wherein the causing of forming interspersed gas and liquid globules by introducing gaseous fluids into said waterdrive creates Jamin Effect capillary blocking of said waterdrive coning to said producing well.

77. The method of claim 66 including applying a liquid pressure medium to the said capillary formation for conveying said vibrations or sonic waves to the liquid in said capillary formation, interposing a buffer medium between said pressure medium and said liquid in said formation for altering the characteristics of the vibration or sonic waves transmitted to said liquid in said capillary formation.

78. The method of claim 77 wherein gaseous fluids ar included in said buffer medium.

79. The method of claim 74 wherein said liquid being controlled as to flow is saline water intruding upon fresh water containing permeable formations wherein pressure sinks are formed by wells producing from said fresh ater formation and said introduction of gaseous fluids for causing the formation of interspersed gas and liquid globules is at injection wells adjacent the intrusion juncture of the saline water into said fresh water, said controlled amplification of said sonic waves or vibration imposed on said liquid creating Jamin Effect capillary blocking of said intrusion of said saline water into said fresh water.

80. The method of claim 74 wherein said liquid being controlled as to flow is water bearing formations intersected by well bores or mine shafts that are going through said water bearing formations and wherein said gaseous fluids are introduced into said water formations from said well bores or said mine shafts, said interspersed gas and liquid globules being formed by said introduction of gaseous fluids into said liquid and said controlled amplification of said sonic waves or vibrations imposed on said liquid creating Jamin Effect capillary blocking to prevent or retard flow of said water into said well bores or said mine shafts.

81. The method of claim 74 wherein said liquid being controlled as to flow is the water of an aqueous permeable formation in which gaseous fluids are being stored and wherein the gaseous fluids being introduced are the gaseous fluids being stored, said causing of interspersed gas and liquid globules being adjacent the juncture or boundary of the stored gaseous fluids and the water that has been pushed back by the introduction of said gaseous fluids being pumped into said aqueous formation and being formed by the introduction of said controlled amplification of said sonic waves or vibration through wells intersecting said liquid adjacent said boundary of said stored gaseous fluids, creating by said interspersed gas and liquid globules Jamin Effect capillary blocking of said water and preventing or retarding flow of said water into said stored gaseous fluids.

82. The method of claim 78 wherein said liquid is a water-drive that is forcing oil and gas to producing wells and said gaseous buffer zone is at the oil and gas front that is being forced to said producing wells by said water drive, said altered characteristics being given to said waterdrive by said gaseous buffer zone being the absorbing and reflection of said sonic waves or vibrations by said gaseous buffer zone, forming a more uniform oil and gas front ahead of said buffer zone, and said sonic wave or vibrational energy assisting in the driving of said oil and gas to said producing wells as well as in the driving of previously by-passed gas into said gaseous buffer zone so as to assist in the maintaining of said buffer zone at said oil and gas front.

83. A method of controlling the area of the path of travel of a waterdrive in an oil and gas bearing strata from a pressuring or injection well to a receiving or producing well which comprises limiting the advance of the front of the waterdrive towards the receiving or producing well by imparting high frequency vibrations or sonic waves of controllable characteristics to the waterdrive from said injection well, utilizing the said vibrations or sonic waves to produce controllable turbulence in the water front flowing through the strata to retard such flow, controlling the turbulence-produced retardation of flow of said waterdrive to the oil and gas front between said two wells to cause a greater proportion of the flow of said waterdrive to move laterally of the oil and gas front and thereby widen the path of travel of said waterdrive from the said pressuring or injection well.

84. The method of claim 83 including the step of introducing gaseous fluids in their liquid or condensed state into the waterdrive at said injection well,
maintaining the gaseous fluids in their liquid or condensed state by maintaining sufficient pressure upon said waterdrive,
lowering the pressure upon said waterdrive sufficiently to permit said gaseous fluids to return to a gaseous state.

85. The method of claim 84 wherein said lowering of the pressure upon said waterdrive and the permitting of said gaseous fluids to return to a gaseous state causes interspersed gas and liquid globules in said water drive which is driving oil and gas to said producing wells which creates Jamin Effect capillary blocking in said water driving strata and prevents or retards coning to or production of said waterdrive by said producing wells through the more permeable portions of said oil and gas strata.

86. The method of claim 84 wherein said lowering of the pressure upon said waterdrive and the permitting of said gaseous fluids to return to a gaseous state creates emulsions at said waterdrive and said oil and gas fronts and assists in the forming of a cushioning buffer zone adjacent said oil and gas front which thereafter assists in the driving of said oil and gas to said production wells.

87. The method of claim 84 wherein said lowering of the pressure upon said waterdrive allows the liberation of free gases adjacent the oil and gas front which freed gases thereafter form a gaseous buffer zone at said oil and gas front by the utilization of said vibrations or sonic waves and wherein said gaseous buffer zone thereafter assists in the driving of oil and gas to production wells by said waterdrive.

88. A method for controlling the flow of liquids in formations of a capillary character which comprises
applying high frequency vibrations or sonic waves of variable characteristics to a front of the liquid at a producing well to thereby create turbulence of the liquid in a predetermined portion of the capillary formation to inhibit further travel of said liquid in a predetermined direction thereby inducing a lateral flow of said liquid in said formation whereby the front of the advancing liquid is broadened.

89. The method of claim 88 wherein said liquid is water driving oil and gas to said producing well.

90. A method of preventing coning of a water drive from an injection well to a producing well in an oil and gas strata which comprises
imposing high frequency vibrations or sonic waves of variable characteristics upon the coning water in the region adjacent said producing oil and gas well to thereby retard flow of said water towards said producing well,
including permitting continued flow of the water drive between that producing well and an adjacent producing well whereby to drive adjacent oil and gas deposits in said strata towards one of said producing wells.

91. A method of preventing coning of a water drive from an injection well to a producing well in an oil and gas strata which comprises
imposing high frequency vibrations or sonic waves of variable characteristics upon the coning water in the region adjacent said producing oil and gas well to thereby retard flow of said water towards said producing well,
wherein the imposing of vibrations or sonic waves upon the coning water produces vibrations or sonic waves of such a character that some of the oil and gas being produced is introduced back into said coning water and forms interspersed gas and liquid globules in said coning water creating Jamin Effect capillary blocking which prevents or retards coning of said water to said producing well.

92. A method of preventing coning of a water drive from an injection well to a producing well in an oil and gas strata which comprises
imposing high frequency vibrations or sonic waves of variable characteristics upon the coning water in the region adjacent said producing oil and gas well to thereby retard flow of said water towards said producing well,
wherein the imposing of vibrations or sonic waves upon the coning water produces vibrations or sonic waves of such a character that some of the oil and gas being produced is introduced back into said coning water and forms an emulsion in said coning water and in more permeable portions of said oil and gas strata through which water is being produced at said production well, retarding or preventing further production of said water at said producing well.

93. A method of preventing coning of a water drive from an injection well to a producing well in an oil and gas strata which comprises
imposing high frequency vibrations or sonic waves of variable characteristics upon the coning water in the region adjacent said producing oil and gas well to thereby retard flow of said water towards said producing well,
wherein the imposing of vibrations or sonic waves upon the coning water produces vibrations or sonic waves of such a character that some of the oil and gas being produced is introduced back into said coning water and forms a cushioning buffer zone at the waterdrive and oil and gas fronts, so that a substantially uniform oil and gas front is formed upon which said waterdrive may continue to drive said oil and gas to said producing well.

* * * * *